(12) United States Patent
Agombar et al.

(10) Patent No.: US 10,459,663 B2
(45) Date of Patent: Oct. 29, 2019

(54) THIN PROVISIONING OF RAID STORAGE

(71) Applicant: International Business Machines Corporation, Armonk, NY (US)

(72) Inventors: John P. Agombar, Winchester (GB); Ian Boden, Southampton (GB); Gordon D. Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 15/412,898

(22) Filed: Jan. 23, 2017

(65) Prior Publication Data

US 2018/0210663 A1 Jul. 26, 2018

(51) Int. Cl.
*G06F 12/00* (2006.01)
*G06F 3/06* (2006.01)
*G06F 11/10* (2006.01)

(52) U.S. Cl.
CPC .......... *G06F 3/0665* (2013.01); *G06F 3/0614* (2013.01); *G06F 3/0689* (2013.01); *G06F 11/1076* (2013.01)

(58) Field of Classification Search
CPC .... G06F 3/0665; G06F 3/0614; G06F 3/0689; G06F 11/1076
See application file for complete search history.

(56) References Cited

U.S. PATENT DOCUMENTS

| 8,364,858 B1* | 1/2013 | Martin | G06F 3/0607 707/809 |
|---|---|---|---|
| 9,146,695 B2 | 9/2015 | Galloway et al. | |
| 2015/0269000 A1 | 9/2015 | Alexeev et al. | |
| 2015/0347435 A1 | 12/2015 | Pavlov et al. | |
| 2016/0077764 A1 | 3/2016 | Ori | |
| 2016/0188211 A1 | 6/2016 | Song et al. | |

FOREIGN PATENT DOCUMENTS

CN 103838524 A 4/2014

OTHER PUBLICATIONS

Feresten et al. "Back to Basics: Netapp Thin Provisioning", NetApp, 5 pages, available at: http://www.netapp.com/us/communities/tech-ontap/tot-btb-thin-provisioning-1010-hk.aspx, last accessed Jan. 17, 2017.

* cited by examiner

*Primary Examiner* — Matthew Bradley
(74) *Attorney, Agent, or Firm* — Kunzler Bean & Adamson

(57) ABSTRACT

This invention relates to a storage system, storage system method and computer program product comprising: providing a distributed collection of drives, each drive having logical blocks, each logical block being assignable to a segment with an associated volume and being configurable to RAID characteristics associated with that volume; assigning a first group of logical blocks to a segment with an associated volume and configuring the first group of logical blocks to RAID characteristics associated with that volume; and wherein a further group of logical blocks is ready to be assigned to any segment but is not yet assigned.

20 Claims, 9 Drawing Sheets

Thin Provisioning RAID Controller 220

Drive Controller 222

Segment Controller 224

Volume RAID Controller 226

Data Rebuilder 228

Thin Provisioning RAID Method 300

Figure 2A

Indirection Table 240

Logical Block Address Segment Mapping 242

Data Block Segment Block Mapping 244

Segment Start Segment Block Mapping 246

RAID address Segment Offset Mapping 248

Figure 2B

THIN PROVISIONING OF RAID STORAGE

BACKGROUND

The present invention relates to a method and apparatus for thin provisioning of RAID storage.

Thin provisioning of a storage system is known, typically there is a storage pool with a fixed real size that contains a volume that is presented to a host system. The volume has a virtual size and takes more of the pool's capacity as more data is written to the volume. The volume comprises storage capacity from one logical unit number (LUN) or from many LUNs. LUNs can be one or more RAID arrays having different RAID profiles. If the volume has many LUNs with different redundancies, then the volume's redundancy is that of the weakest redundancy RAID profile in use. If the volume is constrained to LUNs with a specific redundancy, then the volume cannot increase in size to use more pool storage capacity. Only a small number of drives are able to contribute to rebuilding data for the failed drive when several small RAID arrays are used.

SUMMARY

In an aspect of the invention there is provided a storage system comprising: a collection of drives, each drive having logical blocks, each logical block being assignable to a segment with an associated volume and being configurable to RAID characteristics associated with that volume; a group of logical blocks assigned to a segment with an associated volume and wherein the logical blocks are configured to RAID characteristics associated with that volume; and a further group of logical blocks not yet being assigned to a segment.

In another aspect of the invention there is provided a storage system comprising: a drive controller for providing a collection of drives, each drive having logical blocks; a segment controller for assigning a first group of logical blocks to a first segment with an associated volume and for assigning a further group of logical blocks to a further segment with an associated volume; and a volume RAID controller for configuring groups of logical blocks assigned to segments to RAID characteristics of respective associated volumes.

In a further aspect of the invention there is provided a storage system method comprising: providing a collection of drives, each drive having logical blocks, each logical block being assignable to a segment with an associated volume and being configurable to RAID characteristics associated with that volume; assigning a first group of logical blocks to a segment with an associated volume and configuring the first group of logical blocks to RAID characteristics associated with that volume; and wherein a further group of logical blocks is ready to be assigned to an segment but is not yet assigned.

Logical blocks can be configured to RAID characteristics including one or more of: stripe width; stripe length (also known as stripe length or block size); parity segments; mirror segments and spare segments.

The embodiments grow the proportion of space within individual disk drives allocated to each RAID configuration based on the growth of user level datasets that have configured redundancy requirement. As drives get bigger and multi-use becomes more common then the need for configurable proportions of space increases. Instead of a pool consisting of lots of LUNs with different RAID profiles, a pool consists of a single large LUN using a distributed RAID profile, it then has virtual thin provisioned LUNs that have different RAID profiles, when a volume wants to expand, it takes capacity from the virtual LUN that has the correct RAID profile that has been associated with the volume, the virtual LUN takes the capacity from the single large LUN. This top down approach means that a required level of redundancy a volume can be provided without having to arbitrarily partition up the capacity of the pool.

In yet another aspect of the invention there is provided a computer program stored on a computer readable medium and loadable into the internal memory of a digital computer, comprising software code portions, when said program is run on a computer, for performing the following steps: providing a collection of drives, each drive having logical blocks, each logical block being assignable to a segment with an associated volume and being configurable to RAID characteristics associated with that volume; assigning a first group of logical blocks to a segment with an associated volume and configuring the first group of logical blocks to RAID characteristics associated with that volume; and wherein a further group of logical blocks is ready to be assigned to a segment but is not yet assigned.

BRIEF DESCRIPTION OF THE DRAWINGS

Preferred embodiments of the present invention will now be described, by way of example only, with reference to the following drawings in which:

FIG. 2A is a component diagram of a thin provisioning RAID controller of the preferred embodiment;

FIG. 2B is a component diagram of an indirection table of the preferred embodiment;

DETAILED DESCRIPTION

Figure 1:
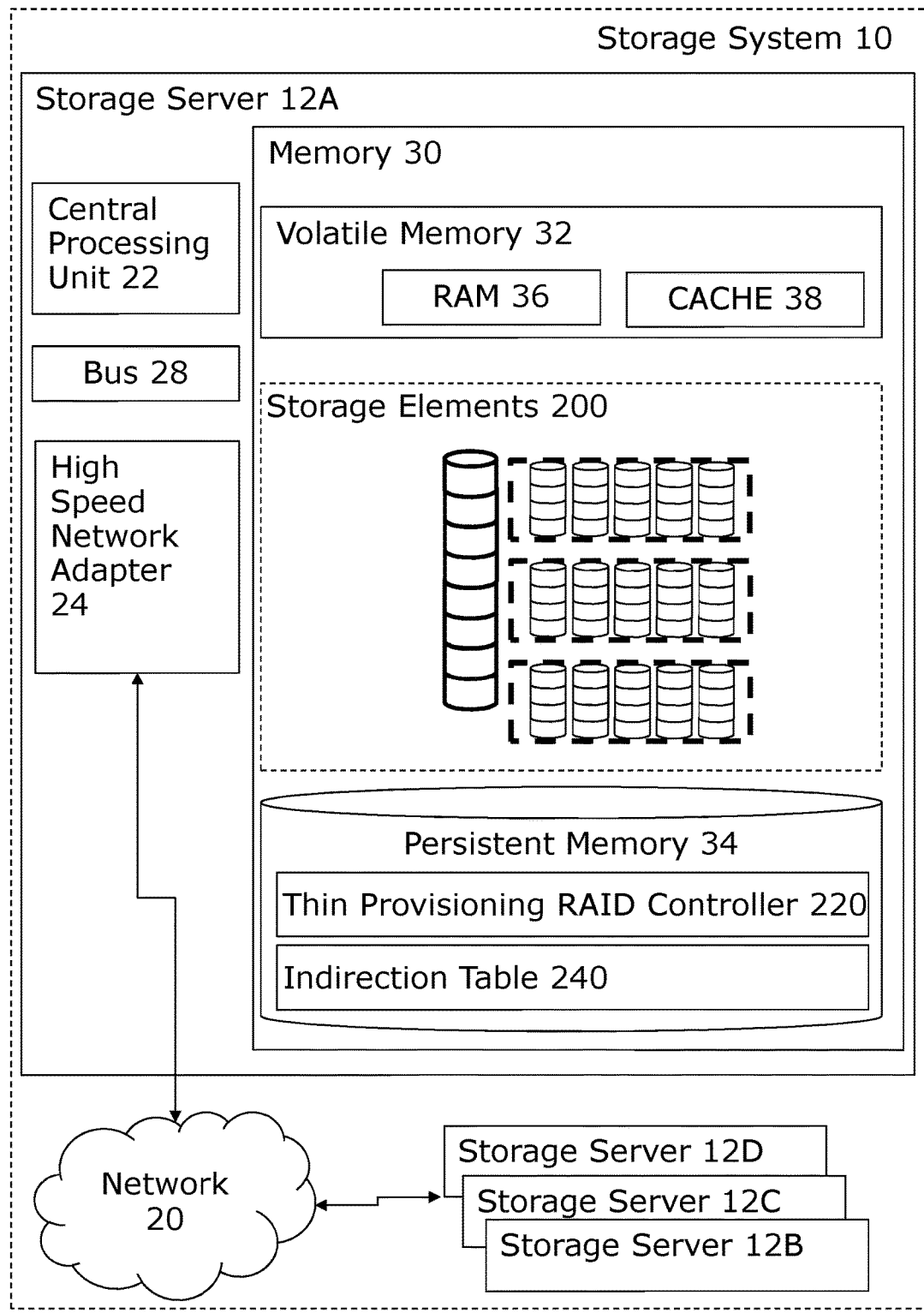
FIG. 1 is a deployment diagram of the preferred embodiment.

Referring to FIG. 1, the deployment of a preferred embodiment in storage system 10 is described. Storage system 10 is operational with numerous other general purpose or special purpose computing system environments or configurations. Examples of computing system environments or configurations that may be suitable for use with storage system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices.

Storage system 10 may be described in the general context of a computer system comprising storage elements and that can execute instructions for controlling the input, output and configuration of the storage elements. Program modules containing instructions are executed by a computer processor. Generally, program modules may include: routines; programs; objects; components; logic; and data structures that perform particular tasks or implement particular abstract data types. Storage system 10 may be embodied in a distributed storage environment where tasks are performed by remote processing devices that are linked through a communications network. In a distributed storage environment, program modules may be located in both local and remote computer system storage media including memory storage devices.

Storage system 10 comprises: one or more storage servers 12A to 12D connected over a network 20. Storage server 12A comprises: central processing unit (CPU) 22; high speed network adapter 24; bus 28 and memory 30.

CPU 22 loads instructions from memory 30 and performs operations in response to the instructions. Such operations include: incrementing or decrementing a value in a register; transferring a value from memory 30 to a register or vice versa; reading or writing a value to or from storage elements 200; branching to a different location in memory if a condition is true or false (also known as a conditional branch instruction); and adding or subtracting the values in two different registers and loading the result in another register. A typical CPU can perform many different machine operations. A set of machine instructions is called a machine code program; the machine instructions are written in a machine code language which is referred to as a low level language. A computer program is typically written in a high level language that needs to be compiled to or interpreted as a machine code program before it can be run.

High speed network adapter 24 is for enabling high speed communication between the storage servers and network devices (not shown).

Bus 28 couples the main system components together including memory 30 to CPU 22.

Memory 30 includes computer system readable media in the form of volatile memory 32; non-volatile or persistent memory 34; and storage elements 200. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Storage elements 200 comprise disk drives arranged into an array.

Machine instructions configured to carry out the functions of the preferred embodiment comprise: thin provisioning RAID controller 220 and indirection table 240. In the preferred embodiment, the instruction modules are loaded from the persistent memory 34, where it is stored, into volatile memory 32 for operation. In another embodiment, ROM in memory 30 stores the instruction modules for enabling the storage server 12A to function as a special purpose computer specific to the module 200. Further program modules that support the preferred embodiment but are not shown include firmware, boot strap program, operating system, and support applications. Each of the operating system; support applications; other program modules; and program data; or some combination thereof may include an implementation of a networking environment.

Referring to FIG. 2A, thin provisioning RAID controller 220 comprises: drive controller 222; segment controller 224; volume RAID controller 226; data rebuilder 228; and thin provisioning RAID method 300.

Drive controller 222 is for providing a distributed collection of drives wherein each drive is divided into logical blocks of addressable storage.

Segment controller 224 is for assigning one or more groups of logical blocks to respective one or more segments and for associating one or more segments with one or more volumes. A volume associated with second or further segment can be an existing volume or a new volume.

Volume RAID controller 226 is for configuring segments of logical blocks to RAID characteristics of respective volumes associated with the segments.

Data rebuilder 228 is for: identifying one or more failed segments with failed logical blocks associated with a failed drive; retrieving RAID characteristics of the identified segments; locating spare logical blocks on the identified segments; locating redundant RAID data corresponding to lost data on the failed logical blocks using retrieved RAID characteristics; and rebuilding lost data on the spare logical blocks from the redundant RAID data. RAID characteristics include one or more of: stripe width; stripe length (also known as stripe length, block size); parity characteristics; mirror characteristics and spare count.

Thin provisioning RAID method 300 is for controlling the components of the thin provisioning RAID controller 220 and is described in more detail below.

Referring to FIG. 2B, indirection table 240 comprises: logical block address segment mapping 242; data block segment block mapping 244; segment start segment block mapping 246; and RAID address segment offset mapping 248. Data storage input and output occurs through indirection table 240.

Logical block address segment mapping 242 is for mapping a logical block address to a segment number and data block offset within that segment.

Data block segment block mapping 244 is for mapping a data block offset within the segment to a segment physical block offset within a segment using standard functions for that particular raid level and ration of distributed spare space.

Segment start segment block mapping 246 is for mapping a segment start address and segment physical block offset to a RAID array physical address.

RAID address segment offset mapping 248 is for mapping a RAID array physical address to a drive and logical block address within that drive.

Figure 2C:
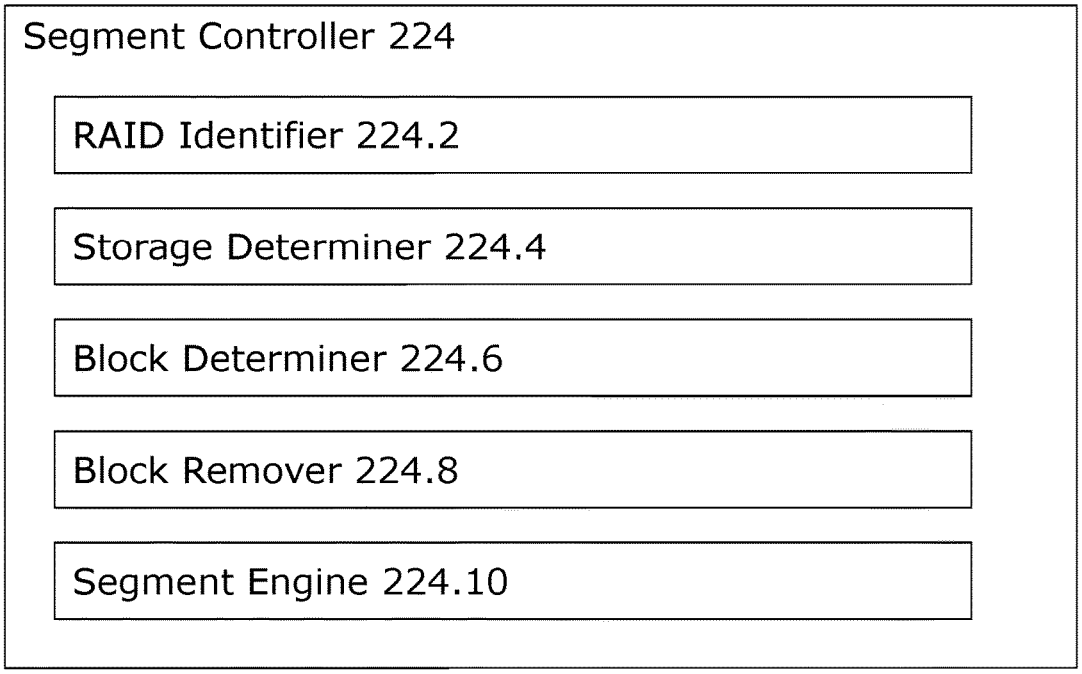
FIG. 2C is a component diagram of a segment controller of the preferred embodiment.

Referring to FIG. 2C, segment controller 224 is described in more detail comprising: RAID identifier 224.2; storage determiner 224.4; block determiner 224.6; block remover 224.8; and segment engine 224.10.

RAID identifier 224.2 is for retrieving RAID characteristics of the volume.

Storage determiner 224.4 is for determining required additional storage.

Block determiner 224.6 is for determining logical blocks to assign based on the retrieved RAID characteristics and the required additional storage.

Block remover 224.8 is for removing determined logical blocks from the group of unassigned logical blocks.

Segment engine 224.10 is for adding determined logical blocks to the segment.

Segment controller 224 works in conjunction with volume RAID controller 226 whereby the volume RAID controller 226 is for configuring determined logical blocks according to the retrieved RAID characteristics.

Figure 2D:
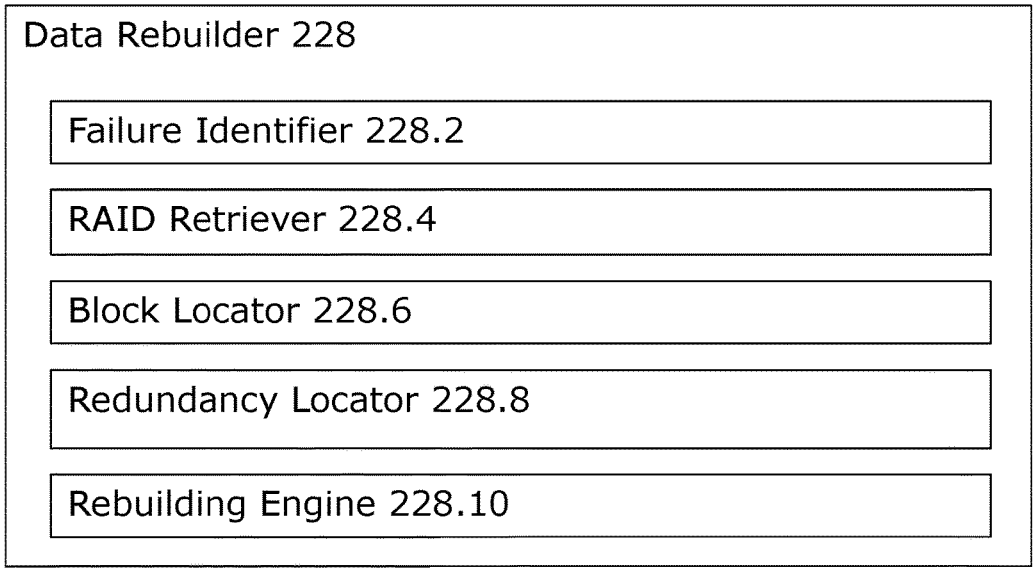
FIG. 2D is a component diagram of a data rebuilder of the preferred embodiment.

Referring to FIG. 2D, data rebuilder 228 is described in more detail comprising: a failure identifier 228.2; a RAID retriever 228.4; a block locator 228.6; a redundancy locator 228.8; and a rebuilding engine 228.10.

Failure identifier 228.2 is for identifying one or more segments with failed logical blocks associated with a failed drive.

RAID retriever 228.4 is for retrieving RAID characteristics of the identified segments.

Block locator 228.6 is for locating spare logical blocks on the identified segments.

Redundancy locator 228.8 is for locating redundant RAID data corresponding to lost data on the failed logical blocks using the retrieved RAID characteristics.

Rebuilding engine 228.10 is for rebuilding lost data on the spare logical blocks from the redundant RAID data.

Figure 3A:
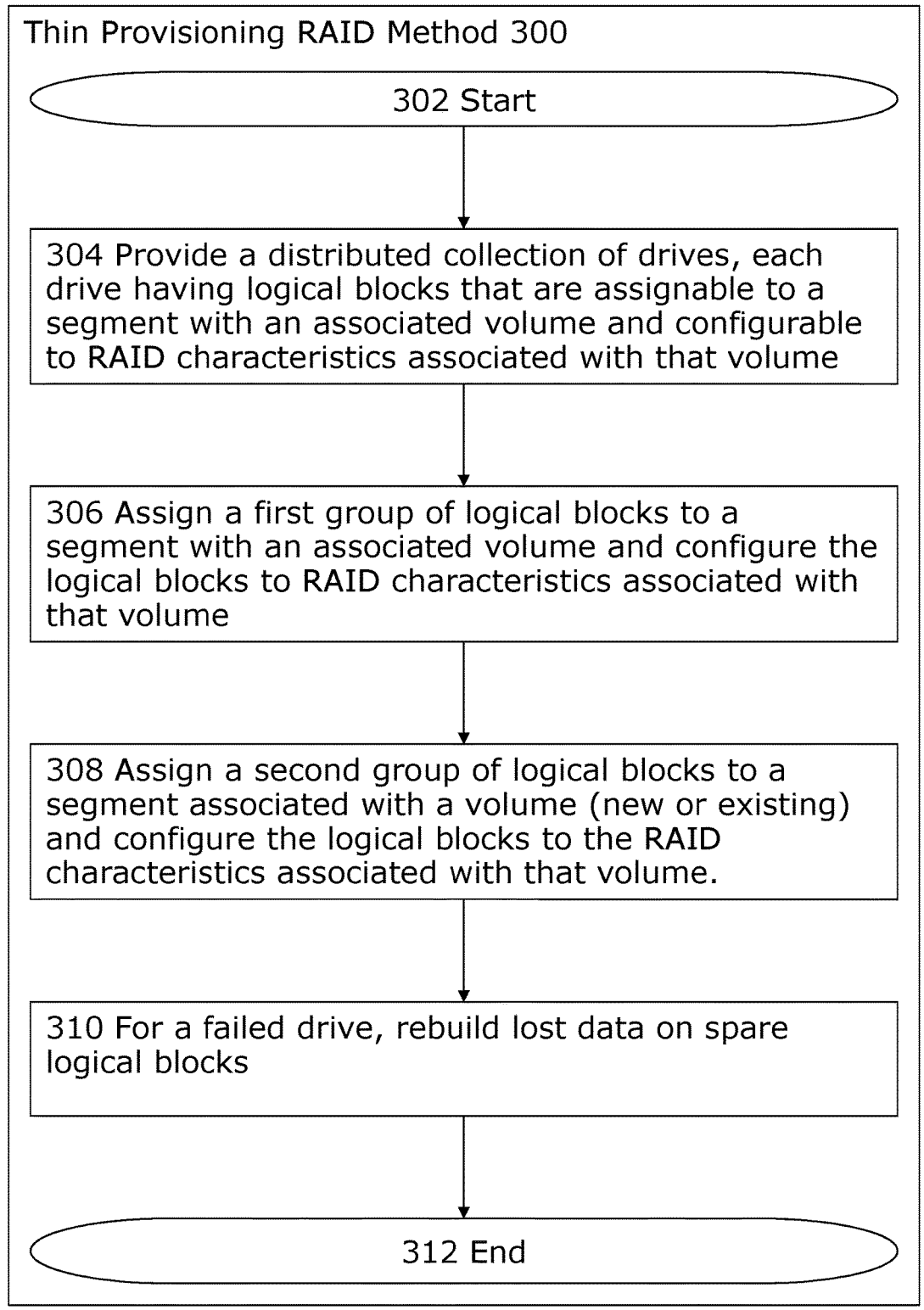
FIG. 3A is a flow diagram of a thin provisioning RAID method of the preferred embodiment.

Referring to FIG. 3A, preferred embodiment thin provisioning RAID method 300 comprises logical process steps 302 to 312. Although there is an order to the preferred embodiment steps as described, the steps may not necessarily need to be in this order unless specified and in other embodiments steps can be in a different order.

Step 302 is the start of the method when the storage system is initialized.

Step 304 is for providing a distributed collection of drives where each drive has logical blocks and each logical block is assignable to a segment with an associated volume and is configurable to RAID characteristics associated with that volume.

Step 306 is for assigning a first group of logical blocks to a segment with an associated volume and configuring the first group of logical blocks to RAID characteristics associated with that volume. A further group of logical blocks is ready to be assigned to any segment but is not yet assigned. Logical blocks that are ready to be assigned to any segment but are not yet assigned are called free logical blocks.

Step 308 is for assigning a second group of logical blocks to a second segment associated with a volume and configuring the second group of logical blocks to that volume. The volume associated with second segment can be an existing volume or a new volume. Step 308 is described in more detail below with respect to FIG. 3B.

Step 310 is for rebuilding lost data on spare logical blocks for a failed drive. Step 310 is described in more detail below with respect to FIG. 3C.

Step 312 is the end of thin provisioning RAID method 300.

Figure 3B:
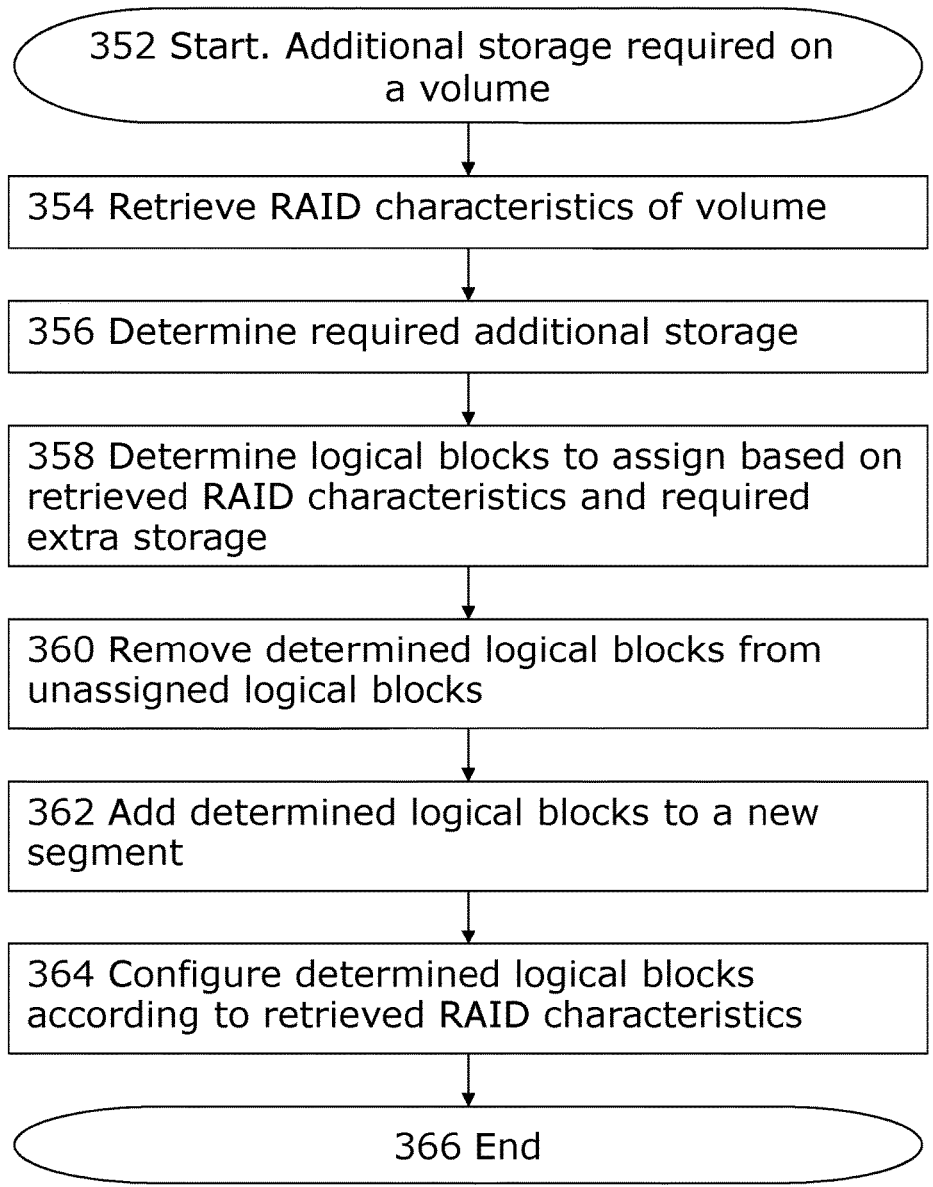
FIG. 3B is a more detailed flow diagram of a logical block assigning process of the thin provisioning RAID method of the preferred embodiment.

Referring to FIG. 3B, step 308 for assigning a second group of logical blocks is described in more detail and comprises logical process substeps 352 to 366.

Substep 352 starts when additional storage is required on a volume (a new volume or an existing volume).

Substep 354 is for retrieving RAID characteristics of the volume.

Substep 356 is for determining required additional storage.

Substep 358 is for determining logical blocks to assign based on the retrieved RAID characteristics and the required additional storage.

Substep 360 is for removing determined logical blocks from the group of unassigned logical blocks.

Substep 362 is for adding determined logical blocks to a segment.

Substep 364 is for configuring the determined logical blocks according to the retrieved RAID characteristics.

Substep 366 is the end of step 308.

Figure 3C:
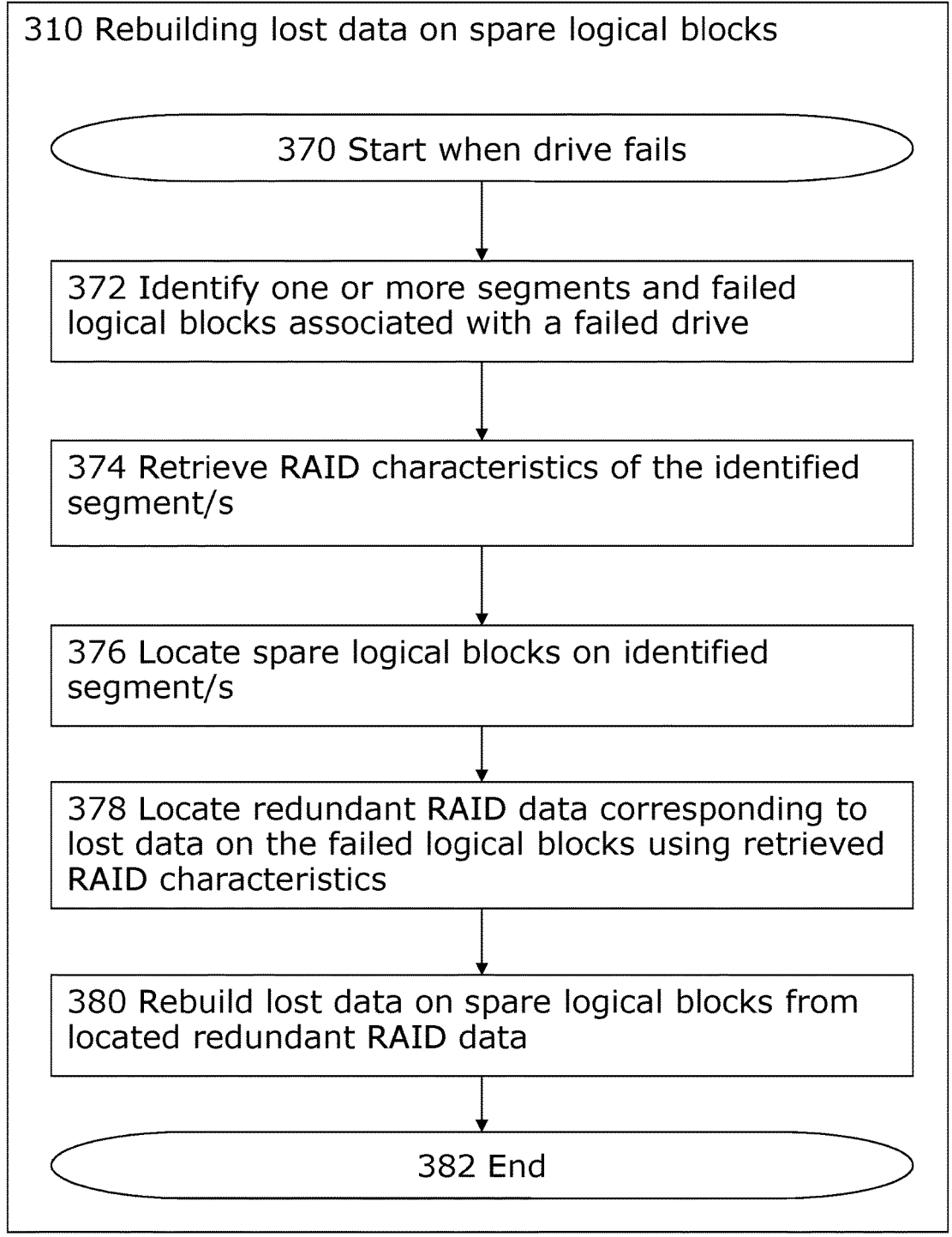
FIG. 3C is a more detailed flow diagram of a data rebuilding process of the thin provisioning RAID method of the preferred embodiment.

Referring to FIG. 3C, step 310 for rebuilding lost data on spare logical blocks comprises logical process substeps 370 to 382. The method is described with respect to one or more segments that may or may not share RAID characteristics.

Substep 370 is the start when a drive fails and there are data losses on corresponding logical blocks on one or more segments.

Substep 372 is for identifying one or more segments and failed logical blocks associated with a failed drive.

Substep 374 is for retrieving RAID characteristics of the identified one or more segments.

Substep 376 is for locating spare logical blocks on the identified one or more segments.

Substep 378 is for locating redundant RAID data corresponding to lost data on the failed logical blocks using the retrieved RAID characteristics.

Substep 380 is for rebuilding the lost data on spare logical blocks from located redundant RAID data using retrieved RAID characteristics.

Substep 382 is the end of step 310.

Figure 4A:
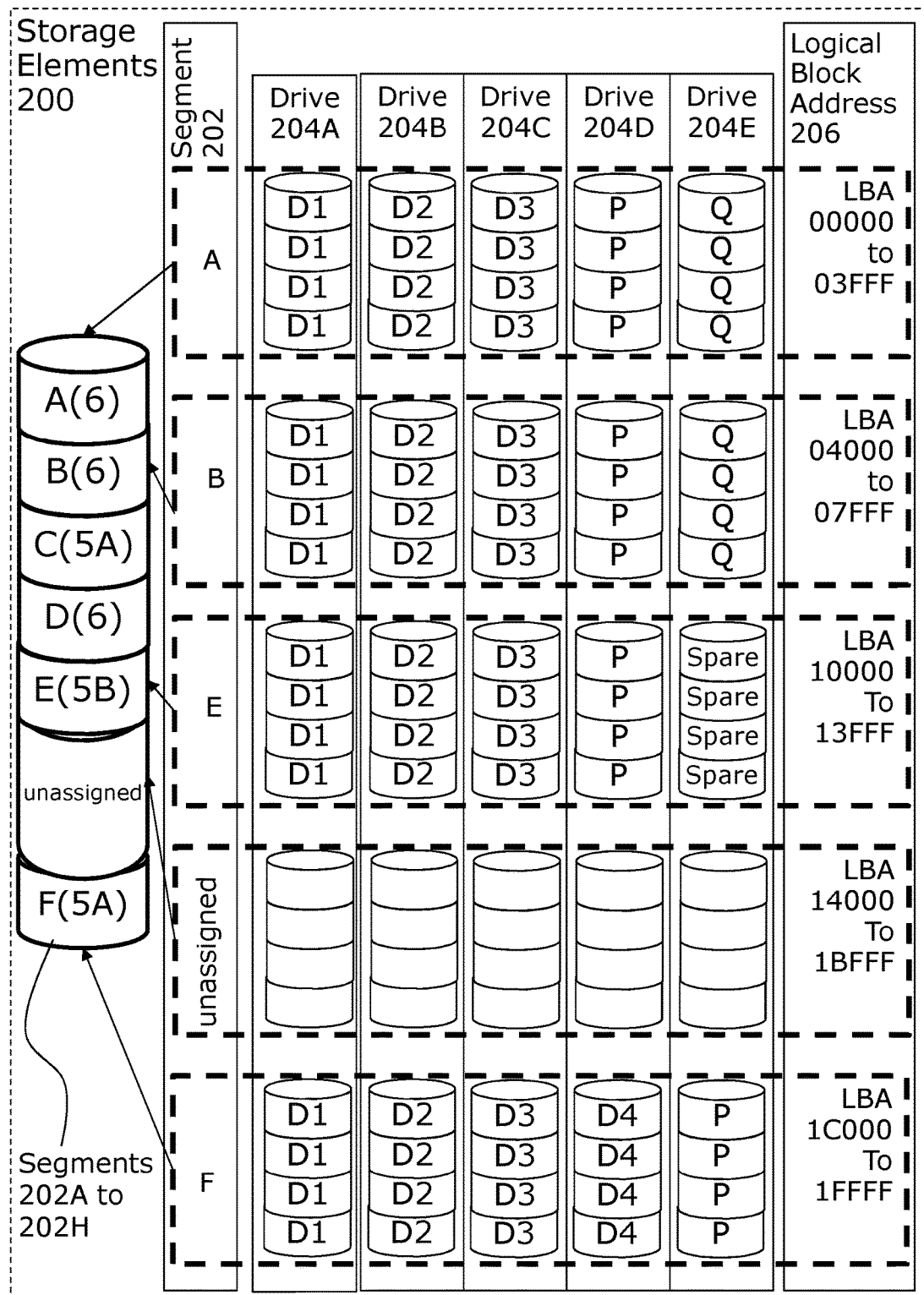
FIG. 4A to 4C are schematic diagrams of an example storage element configuration according to the preferred embodiment.
Figure 4B:
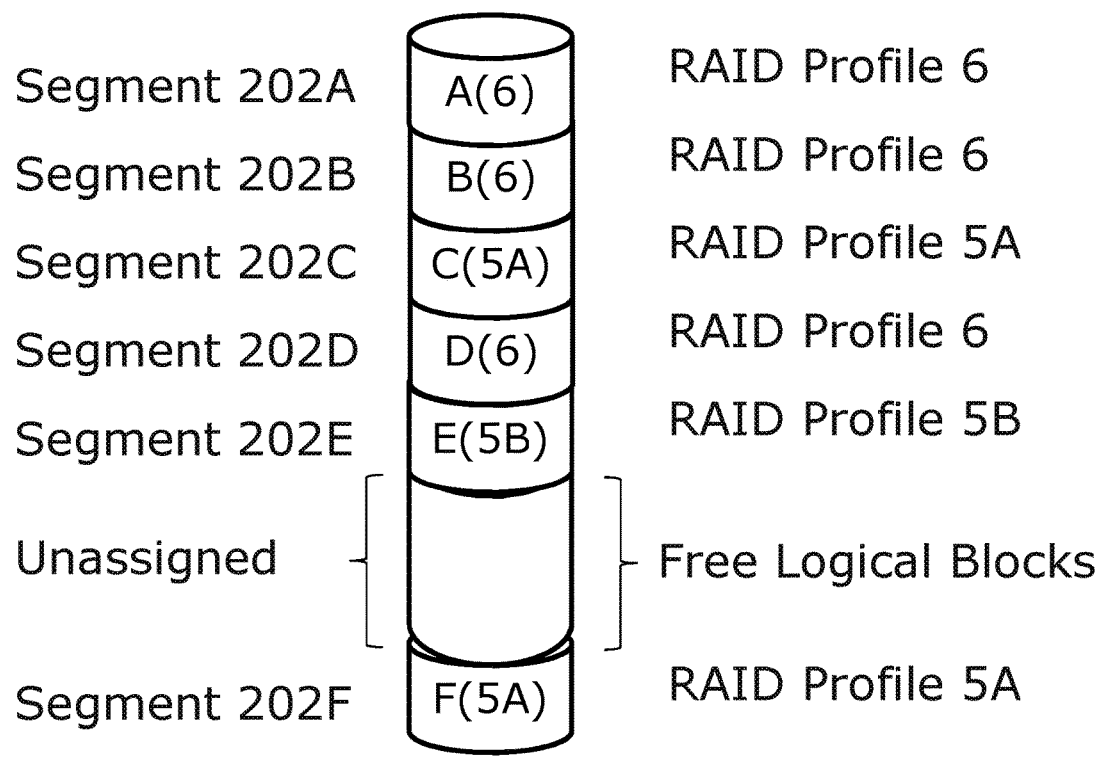
Figure 4C:
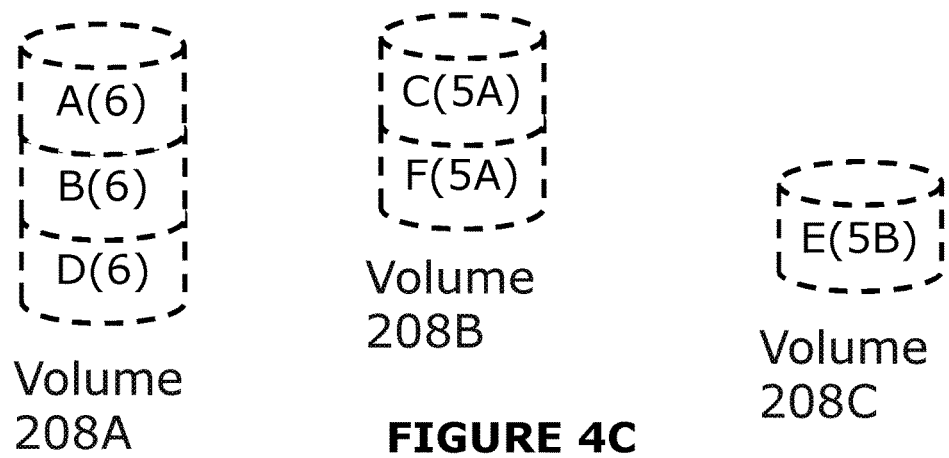

Referring to FIGS. 4A, 4B and 4C there is described an example configuration of storage elements 200 comprising: a distributed collection of drives (Drive 204A to E) (see FIG. 4A), each drive having logical blocks 206 (LBA 0000 to 1FFFF), each logical block being assignable to a segment (202A to 202F) with an associated volume (208A to 208C) (see FIG. 4C) and being configurable to RAID characteristics (see FIG. 4B) associated with that volume (208A to 208C); a group of logical blocks (LBA 00000 to 03FFF) assigned to a segment (202A) with an associated volume (208A) and wherein the logical blocks (LBA 00000 to 03FFF) are configured to RAID characteristics (RAID 6) associated with that volume (208A); and a further group of logical blocks (LBA 14000 to 1BFFF) not yet being assigned to a segment.

Example configuration of storage elements 200 further comprises a second group of logical blocks (LBA 04000 to 07FFF) assigned to a second segment (202B) associated with a volume (208A) and wherein the second group of logical blocks is configured to the existing RAID characteristics (RAID profile 6) associated with that volume (208A).

Example configuration of storage elements 200 further comprising a third group of logical blocks (LBA 10000 to 13FFF) assigned to a third segment (202E) associated with a volume (208C) and wherein the third group of logical blocks is configured to a new RAID characteristic (RAID profile 5B) associated with that volume (208C).

Example configuration of storage elements 200 further comprising a fourth group of logical blocks (LBA 14000 to 1BFFF) illustrated as not assigned or associated to any segments and therefore not associated with a volume. The fourth group of logical blocks are free logical blocks ready to be assigned to a segment and configured to a RAID characteristic associated with a volume.

Example configuration of storage elements 200 further comprising a fifth group of logical blocks (LBA 1C000 to 1FFFF) assigned to a fifth segment (202F) associated with a volume (208B) and wherein the fifth group of logical blocks is configured to a new RAID characteristic (RAID profile 5A) associated with that volume (208B).

The second group of logical blocks (LBA 04000 to 07FFF) is assigned to the second segment (202B) in the following way. The RAID characteristics of the associated volume are retrieved (RAID profile 6 comprising three stripes of logical blocks (D1; D2 and D3) and two parity logical blocks (P and Q)). The number of required extra storage space is determined as twelve logical blocks. The numbers of logical blocks to assign is determined based on the retrieved RAID characteristics (three stripes and two parity logical blocks) and the required extra storage space (twelve logical blocks). For every three logical blocks required, five logical blocks will be assigned because of the two parity logical blocks that are required. Therefore, in this example, twenty logical blocks are to be assigned for the required fifteen logical blocks (if each logical block represents 1 Kilobyte (1 KB) then 20 KB are assigned for the required 15 KB). Twenty logical blocks are removed from the group of unassigned logical blocks. Twenty logical blocks are added to segment 202B. Then the twenty logical blocks are configured according to RAID profile 6 and the retrieved RAID characteristics comprise three stripes of logical blocks (D1; D2 and D3) and two parity logical blocks (P and Q). The configured twenty logical blocks are then associated with volume 208A.

Example configuration of storage elements 200 comprises three RAID configurations: RAID profile 6; RAID profile 5A; and RAID profile 5B. RAID profile 6 is this example using three stripes of logical blocks (D1; D2 and D3) and two parity logical blocks (P and Q). RAID profile 5A is this example uses three stripes of logical blocks (D1; D2 and D3); one parity logical block (P); and a spare logical block (for use in rebuilding a failed drive). RAID profile 5B is this example uses four stripes of logical blocks (D1; D2; D3 and D4); and one parity logical block (P) (and no spare). These are only examples and other example can use other RAID profile having others RAID characteristics taken from: stripe width; stripe length; parity characteristics; mirror characteristics and spare count.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device . . . .

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital video disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded on to a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

The invention claimed is:

1. A storage system comprising:
a distributed collection of drives, each drive including a set of logical blocks, each logical block being assignable to a segment with an associated volume and being configurable to RAID characteristics associated with that volume;
a first group of logical blocks assigned to a first segment with an associated first volume and wherein the first group of logical blocks are configured to a first RAID characteristic associated with the first volume;
a second group of logical blocks assigned to a second segment with an associated second volume and wherein the second group of logical blocks are configured to a second RAID characteristic associated with the second volume; and
a third group of logical blocks,
wherein:
each logical block of the third group of logical blocks is assignable to one of the first segment and the second segment,
the first RAID characteristic and the second RAID characteristic are different RAID characteristics,
each logical block of the third group of logical blocks that is assigned to the first segment is configured to the first RAID characteristic, and
each logical block of the third group of logical blocks that is assigned to the second segment is configured to the second RAID characteristic.

2. A storage system according to claim 1 wherein each of the first RAID characteristic and the second RAID characteristic is an existing RAID characteristic or a new RAID characteristic.

3. A storage system according to claim 2 wherein the second volume is an existing volume or a new volume.

4. A storage system according to claim 1 wherein the first and second RAID characteristics include one or more of:
a stripe width;
a stripe length;
parity segments;
mirror segments; and
spare segments.

5. A storage system comprising:
a drive controller for providing a distributed collection of drives, each drive including a set of logical blocks;
a segment controller for:
assigning a first group of logical blocks to a first segment with an associated first volume,
assigning a second group of logical blocks to a second segment with an associated second volume, and
assigning a third group of assignable logical blocks to one of the first segment and the second segment and
a volume RAID controller for configuring groups of logical blocks assigned to segments to the RAID characteristics of their respective associated volumes,
wherein:
each assignable logical block of the third group that is assigned to the first segment is configured to a first RAID characteristic, and
each assignable logical block of the third group that is assigned to the second segment is configured to a second RAID characteristic.

6. A storage system according to claim 5 wherein the second group of logical blocks is an existing group of logical blocks or a new group of logical blocks.

7. A storage system according to claim 6 wherein the second volume is an existing volume or a new volume.

8. A storage system according to claim 6 wherein the segment controller comprises:
   a RAID identifier for retrieving RAID characteristics of each volume;
   a storage determiner for determining required additional storage;
   a block determiner for determining assignable logical blocks of the third group of assignable logical blocks to assign based on the retrieved RAID characteristics and the required additional storage;
   a block remover for removing determined assignable logical blocks of the third group of assignable logical blocks from the third group of assignable logical blocks; and
   a segment engine for adding determined assignable logical blocks of the third group of assignable logical blocks to the first segment of the second segment,
   wherein the volume RAID controller is for configuring determined assignable logical blocks of the third group of assignable logical blocks according to the retrieved RAID characteristics.

9. A storage system according to claim 5 wherein the data rebuilder comprises:
   a failure identifier for identifying one or more segments with failed logical blocks associated with a failed drive;
   a RAID retriever for retrieving RAID characteristics of the identified segments;
   a block locator for locating spare logical blocks on the identified segments;
   a redundancy locator for locating redundant RAID data corresponding to lost data on the failed logical blocks using the retrieved RAID characteristics; and
   a rebuilding engine for rebuilding lost data on the spare logical blocks from the redundant RAID data.

10. A storage system according to claim 6 wherein the first and second RAID characteristics include one or more of:
    a stripe width;
    a stripe length;
    parity segments;
    mirror segments; and
    spare segments.

11. A method of operating a storage system comprising:
    providing a distributed collection of drives, each drive including a set of logical blocks, each logical block being assignable to a segment with an associated volume and being configurable to RAID characteristics associated with that volume;
    assigning a first group of logical blocks to a first segment with an associated first volume;
    assigning a second group of logical blocks to a second segment with an associated second volume;
    configuring the first group of logical blocks to a first RAID characteristic associated with the first volume; and
    configuring the second group of logical blocks to a second RAID characteristic associated with the second volume,
    wherein:
       each logical block of a third group of logical blocks is assignable to one of the first segment and the second segment,
       the first RAID characteristic and the second RAID characteristic are different RAID characteristics,
       each logical block of the third group of logical blocks that is assigned to the first segment is configured to the first RAID characteristic, and
       each logical block of the third group of logical blocks that is assigned to the second segment is configured to the second RAID characteristic.

12. A method according to claim 11 wherein assigning the second group of logical blocks to the second segment associated with the second volume comprises assigning existing logical blocks or new logical blocks to the second segment.

13. A method according to claim 12 wherein the second volume associated with the second segment is an existing volume or a new volume.

14. A method according to claim 11 wherein assigning the second group of logical blocks to the second segment associated with the second volume comprises:
    retrieving the second RAID characteristic of the second volume;
    determining required additional storage;
    determining third logical blocks to assign based on the retrieved second RAID characteristic and the required additional storage;
    removing determined third logical blocks from the group of third logical blocks;
    adding determined third logical blocks to the second segment; and
    configuring determined third logical blocks according to the retrieved second RAID characteristic.

15. A method according to claim 11 comprising:
    identifying one or more segments with failed logical blocks associated with a failed drive;
    retrieving RAID characteristics of the identified segments; locating spare logical blocks on the identified segments;
    locating redundant RAID data corresponding to lost data on the failed logical blocks using retrieved RAID characteristics; and
    rebuilding lost data on the spare logical blocks from the located redundant RAID data.

16. A method according to claim 11 wherein the first and second RAID characteristics comprise one or more of:
    a stripe width;
    a stripe length;
    parity segments;
    mirror segments; and
    spare segments.

17. A computer program stored on a computer readable medium and loadable into the internal memory of a digital computer, comprising software code portions, when said program is run on a computer, for operating a storage system by:
    providing a distributed collection of drives, each drive including a set of logical blocks, each logical block assignable to a segment with an associated volume and configurable to RAID characteristics associated with that volume;
    assigning a first group of logical blocks to a first segment with an associated first volume and configuring the first group of logical blocks to first RAID characteristics associated with the first volume;
    assigning a second group of logical blocks to a second segment with an associated second volume and configuring the second group of logical blocks to second RAID characteristics associated with the second volume, wherein:
each logical block of a third group of logical blocks is assignable to one of the first segment and the second segment,
the first RAID characteristic and the second RAID characteristic are different RAID characteristics,
each logical block of the third group of logical blocks that is assigned to the first segment is configured to the first RAID characteristic, and
each logical block of the third group of logical blocks that is assigned to the second segment is configured to the second RAID characteristic.

18. A computer program according to claim 17 wherein assigning the second group of logical blocks to the second segment associated with the second volume comprises assigning existing logical blocks or new logical blocks to the second segment.

19. A computer program according to claim 17 wherein assigning the second group of logical blocks to the second segment associated with the second volume comprises:
retrieving the second RAID characteristics of the second volume;
determining required additional storage;
determining third logical blocks to assign based on the retrieved second RAID characteristics and the required additional storage;
removing determined third logical blocks from the third group of logical blocks;
adding determined third logical blocks to the second segment; and
configuring determined third logical blocks according to the retrieved second RAID characteristics.

20. A computer program according to claim 17 comprising:
identifying one or more segments with failed logical blocks associated with a failed drive; retrieving RAID characteristics of the identified segments;
locating spare logical blocks on the identified segments; locating redundant RAID data corresponding to lost data on the failed logical blocks using retrieved RAID characteristics; and
rebuilding lost data on the spare logical blocks from the located redundant RAID data.

* * * * *